US011874557B2

(12) United States Patent
Teragawa

(10) Patent No.: US 11,874,557 B2
(45) Date of Patent: Jan. 16, 2024

(54) DISPLAY DEVICE

(71) Applicant: Sharp Display Technology Corporation, Kameyama (JP)

(72) Inventor: Daisuke Teragawa, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/202,983

(22) Filed: May 29, 2023

(65) Prior Publication Data

US 2023/0384637 A1    Nov. 30, 2023

(30) Foreign Application Priority Data

May 31, 2022    (JP) .................................. 2022-088962

(51) Int. Cl.
  *G02F 1/13357*    (2006.01)
(52) U.S. Cl.
  CPC .. *G02F 1/133608* (2013.01); *G02F 1/133603* (2013.01); *G02F 1/133605* (2013.01)
(58) Field of Classification Search
  CPC ......... G02F 1/133608; G02F 1/133605; G02F 1/133616
  See application file for complete search history.

(56) References Cited

U.S. PATENT DOCUMENTS

| | | | | |
|---|---|---|---|---|
| 2008/0117356 A1* | 5/2008 | Oku | ................. | G02F 1/133609 362/249.16 |
| 2012/0063133 A1 | 3/2012 | Takeuchi et al. | | |
| 2012/0087122 A1 | 4/2012 | Takeuchi et al. | | |
| 2012/0087126 A1 | 4/2012 | Takeuchi et al. | | |
| 2012/0105763 A1 | 5/2012 | Takeuchi et al. | | |
| 2013/0279173 A1 | 10/2013 | Takeuchi et al. | | |
| 2014/0098520 A1 | 4/2014 | Takeuchi et al. | | |
| 2014/0313733 A1 | 10/2014 | Takeuchi et al. | | |

FOREIGN PATENT DOCUMENTS

JP    2013214528 A    10/2013

* cited by examiner

*Primary Examiner* — Karabi Guharay
(74) *Attorney, Agent, or Firm* — ScienBiziP, P.C.

(57) ABSTRACT

A reflective sheet is attached to a front face of a light source substrate so as to cover a head portion of a fixing member, a bridge across the head portion of the fixing member is formed by providing a slit in the reflective sheet, and the bridge is disposed so as to pass through a central portion of a region surrounded by four light sources around the head portion of the fixing member.

10 Claims, 11 Drawing Sheets

DISPLAY DEVICE

CROSS-REFERENCE TO RELATED APPLICATIONS

This application claims the benefit of priority to Japanese Patent Application Number 2022-088962 filed on May 31, 2022. The entire contents of the above-identified application are hereby incorporated by reference.

BACKGROUND

Technical Field

The disclosure relates to a display device to be used for, for example, a monitor display, a television receiver, or the like, and particularly, to a backlight of a display device.

In a display device including a display panel having no light-emitting function such as a liquid crystal display panel, a backlight is used as an illumination device for displaying an image on the display panel (see JP 2013-214528 A). A configuration of a backlight according to the related art will be briefly described as follows.

A chassis (referred to as a substrate support body in JP 2013-214528 A) is provided at a back face side of the display panel. A plurality of light source substrates (referred to as substrates in JP 2013-214528) are attached to a front face of the chassis by using fixing members. Each light source substrate includes, on its front face, a plurality of light sources that emit light toward the display panel. Further, a reflective sheet is attached to the front face of the chassis so as to cover the plurality of light source substrates, and the reflective sheet reflects light emitted from the light sources toward the display panel side. The reflective sheet includes a plurality of openings (referred to as first holes in JP 2013-214528 A) for exposing the plurality of light sources. The reflective sheet includes insertion holes (referred to as second holes in JP 2013-214528 A) through which the fixing members are inserted. In order to prevent the light emitted from the light source from being blocked by the head portion of the fixing member, a dimension from the front face of the substrate to the top portion of the head portion of the fixing member is set to be shorter than a dimension from the front face of the substrate to the top portion of the light source. Note that the reflective sheet covers connectors that connect the plurality of light source substrates, and slits are formed at positions of the reflective sheet corresponding to the connectors.

SUMMARY

Incidentally, due to a difference in light reflectivity between the reflective sheet and the head portion of the fixing member, a dark portion at a position of the display panel corresponding to the head portion of the fixing member may be conspicuous. On the other hand, when the reflective sheet is attached to the front face of the light source substrate to cover the head portion of the fixing member so as not to generate the dark portion at the position corresponding to the head portion of the fixing member, the periphery of the portion of the reflective sheet covering the head portion of the fixing member will rise up from the front face of the light source substrate by an amount corresponding to a thickness of the head portion of the fixing member. Then, when the rise of the reflective sheet progresses to the vicinity of the light source around the head portion of the fixing member with the lapse of time, a part of light emitted from the light source is blocked by the raised portion of the reflective sheet, so that there is a problem that luminance unevenness of the display panel becomes conspicuous and the display quality of the display device is deteriorated. In particular, when an arrangement pitch of the plurality of light sources becomes dense, the above-described problem becomes more notable.

Thus, it is an object of an aspect of the disclosure to improve the display quality of a display device by making the luminance unevenness of a display panel inconspicuous.

In order to solve the above problem, a display device according to an aspect of the disclosure includes a chassis provided at a back face side of a display panel configured to display an image, a light source substrate attached to a front face of the chassis by using a fixing member, the light source substrate including, at a front face of the light source substrate, a plurality of light sources configured to emit light toward the display panel, and a reflective sheet attached to the front face of the light source substrate in a manner of covering a head portion of the fixing member, the reflective sheet including a plurality of openings configured to expose the plurality of light sources, the reflective sheet being configured to reflect the light emitted from the plurality of light sources toward a side of the display panel. A bridge across the head portion of the fixing member is formed (partitioned) in the reflective sheet by a slit, and the bridge passes through a central portion of a region surrounded by four light sources around the head portion of the fixing member among the plurality of light sources.

According to an aspect of the disclosure, it is possible to make the luminance unevenness of the display panel inconspicuous and improve the display quality of the display device.

BRIEF DESCRIPTION OF DRAWINGS

The disclosure will be described with reference to the accompanying drawings, wherein like numbers reference like elements.

DESCRIPTION OF EMBODIMENTS

Figure 1:
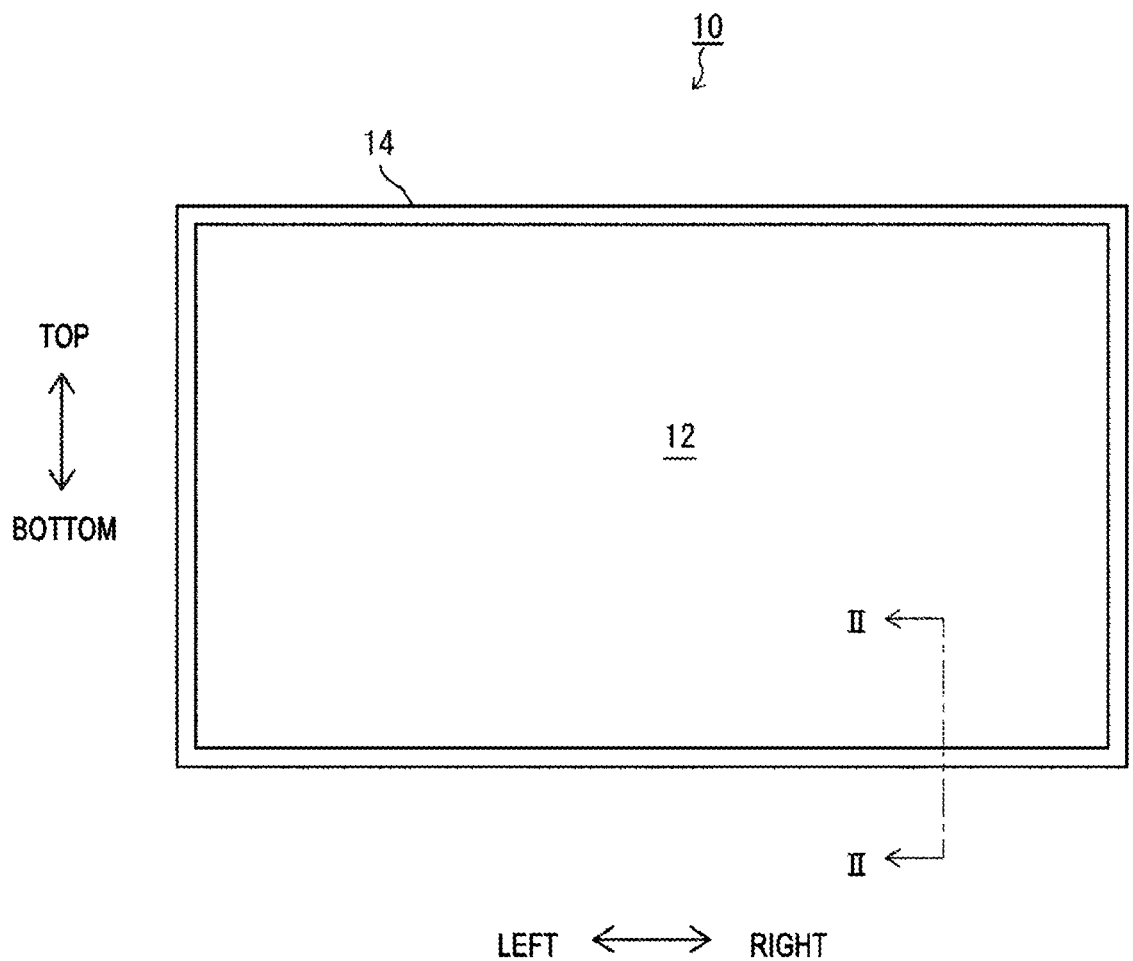
FIG. 1 is a schematic front view of a display device according to a first embodiment of the disclosure.

Embodiments according to the disclosure will be described below with reference to the drawings. As illustrated in the drawings, based on a state where the display device is erected, a front face side of a display device is referred to as a front side, a back face side of the display device is referred to as a back side, one side in a width direction of the display device is referred to as a left side, the other side in the width direction of the display device is referred to as a right side, one side in a height direction of the display device is referred to as an upper side, and the other side in the height direction of the display device is referred to as a lower side.

First Embodiment

Figure 2:
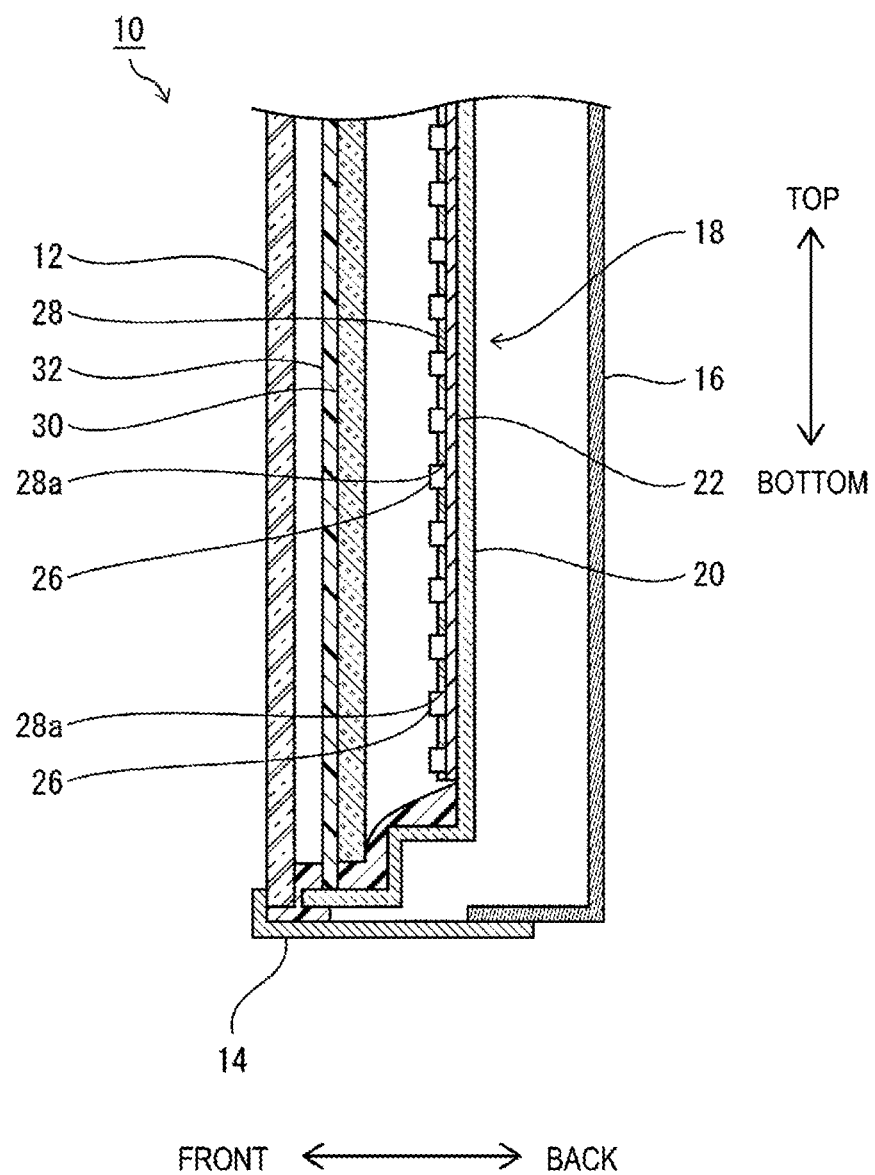
FIG. 2 is a schematic cross-sectional view taken along a line II-II in FIG. 1.
Figure 3:
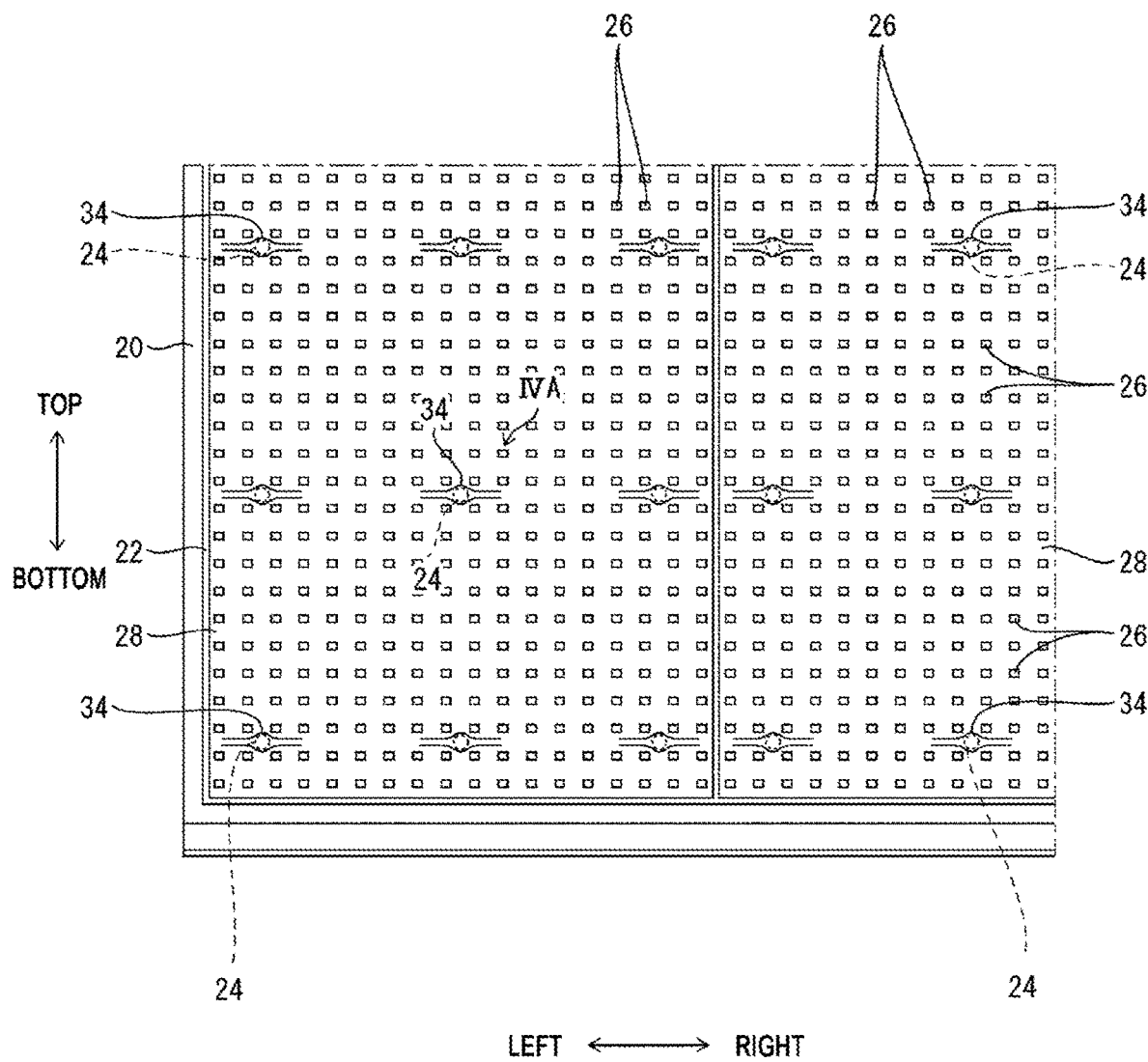
FIG. 3 is a schematic partial front view illustrating a state where a reflective sheet including bridges according to the first embodiment of the disclosure is attached to a light source substrate.

With reference to FIG. 1 to FIG. 5, an embodiment of the disclosure will be described. FIG. 1 is a schematic front view of a display device according to a first embodiment of the disclosure. FIG. 2 is a schematic cross-sectional view taken along a line II-II in FIG. 1. FIG. 3 is a schematic partial front view illustrating a state where a reflective sheet including bridges according to the first embodiment of the disclosure is attached to a light source substrate. FIG. 4A is an enlarged view of IVA in FIG. 3. FIG. 4B is a schematic cross-sectional view taken along a line IVB-IVB illustrated in FIG. 4A.

Outline of Display Device 10

As illustrated in FIG. 1 and FIG. 2, a display device 10 according to the first embodiment of the disclosure is used for, for example, a monitor display, a television receiver, or the like. The display device 10 includes a display panel 12 having a rectangular shape, the display panel 12 being configured to display an image, and the display panel 12 extends in a left-right direction (width direction). The display panel 12 is a liquid crystal panel in which liquid crystal (not illustrated) is sealed between an array substrate (not illustrated) and a color filter substrate (not illustrated), and does not have a light-emitting function.

The display device 10 includes a frame 14 having a rectangular frame-like shape, the frame 14 surrounds the display panel 12 and holds the display panel 12. The frame 14 is made of, for example, metal such as aluminum or synthetic resin. Further, the display device 10 includes a cabinet 16 provided so as to cover a back face side of the display panel 12, and the cabinet 16 is fixed to the frame 14. The cabinet 16 is made of metal such as aluminum or synthetic resin, for example. The display device 10 further includes a backlight 18 disposed between the display panel 12 and the cabinet 16. The backlight 18 is an illumination device for displaying an image on the display panel 12.

Next, a specific configuration of the backlight 18 will be described.

Chassis 20

As illustrated in FIG. 2, a chassis 20 is provided at the back face side of the display panel 12, and the chassis 20 is fixed to the frame 14. The chassis 20 is made of, for example, metal such as aluminum or iron.

Light Source Substrate 22 and Light Emitting Diode 26

Figure 4A:
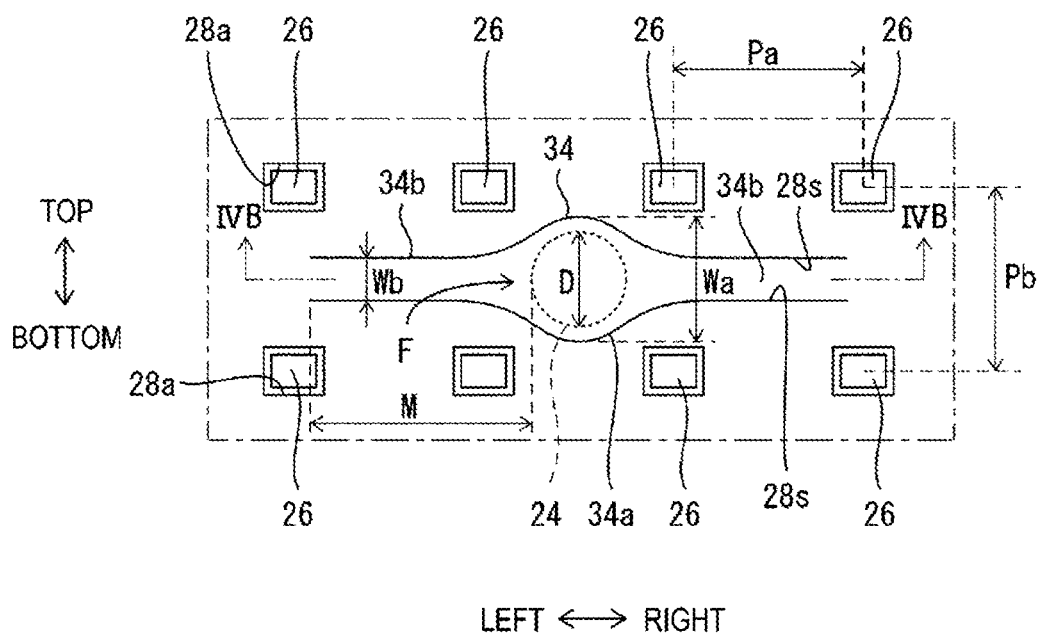
FIG. 4A is an enlarged view of IVA in FIG. 3.

As illustrated in FIG. 2, FIG. 3, and FIG. 4A, the light source substrate 22 having a rectangular shape is attached to the front face of the chassis 20 by using a plurality of screws 24 serving as a plurality of fixing members. The light source substrate 22 includes, on its front face, a plurality of light emitting diodes 26 serving as the plurality of light sources that emit light toward the display panel 12. Each light emitting diode 26 has a rectangular shape in a front view, and the plurality of light emitting diodes 26 are arranged in a matrix. Each of an arrangement pitch Pa in the left-right direction (width direction) and an arrangement pitch Pb in the vertical direction (height direction) of the plurality of light emitting diodes 26 is, for example, 10 mm. An outer diameter D that is a maximum width of the head portion of the screw 24 is, for example, 5.5 mm. Note that instead of using the screw 24 as a fixing member, a fixing member other than the screw such as a rivet may be used. Each light emitting diode 26 may have a square shape or a circular shape instead of the rectangular shape, in the front view.

Reflective Sheet 28

As illustrated in FIG. 2 and FIG. 3, a plurality of reflective sheets 28 each of which has a rectangular shape are attached to the front face of the light source substrate 22 so as to cover the head portions of the plurality of screws 24. Each reflective sheet 28 is made of foamed white PET, for example. The foamed white PET is white PET having a porous surface, and the white PET is PET (polyethylene terephthalate) to which a white pigment is added. The thicknesses of the reflective sheets 28 are, for example, equal to or more than 0.1 mm and equal to or less than 0.3 mm.

As illustrated in FIG. 2, FIG. 3 and FIG. 4A, each reflective sheet 28 includes a plurality of openings 28a for exposing the plurality of light emitting diodes 26. Each opening 28a of each reflective sheet 28 has a rectangular shape in a front view, and the plurality of openings 28a of each reflective sheet 28 are arranged in a matrix. A gap between the opening 28a of each reflective sheet and the corresponding light emitting diode 26 is a gap for securing an attachment tolerance of each reflective sheet 28, and is, for example, 0.5 mm. Each opening 28a of each reflective sheet 28 may have a square shape or a circular shape instead of the rectangular shape, in the front view.

Diffuser Plate 30 and Optical Sheet 32

As illustrated in FIG. 2, a diffuser plate 30 having a rectangular shape is provided between the display panel 12 and the light source substrate 22 to diffuse light emitted from the plurality of light emitting diodes 26 in a surface direction. In addition, an optical sheet 32 having a rectangular shape is provided between the diffuser plate 30 and the display panel 12 to direct a traveling direction of the diffused light toward the display panel 12 side. The optical sheet 32 includes at least one of a diffuser sheet, a lens sheet, and a reflective polarizing sheet.

Bridge 34

Figure 4B:
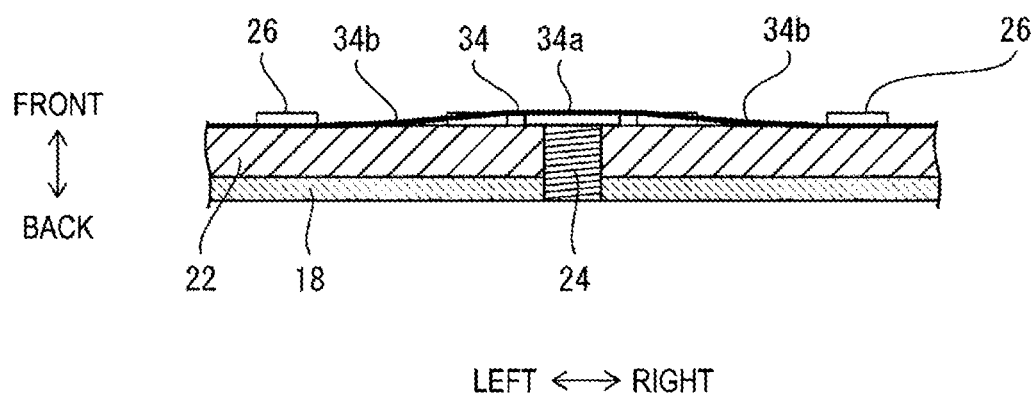
FIG. 4B is a schematic cross-sectional view taken along a line IVB-IVB illustrated in FIG. 4A.

As illustrated in FIG. 3, FIG. 4A, and FIG. 4B, a plurality of bridges 34 across the head portions of the screws 24 are formed (partitioned) by the slits 28s in each reflective sheet 28. Each bridge 34 has an I-shape in a front view. When a portion of the reflective sheet 28 excluding the bridges 34 is referred to as a reflective sheet main body, each bridge 34 is connected to the reflective sheet main body at end portions thereof. Each bridge 34 is disposed so as to pass through a central portion of a region F surrounded by four light emitting diodes 26 around the head portion of each screw 24 among the plurality of light emitting diodes 26. The four light emitting diodes 26 around the head portion of each screw 24 refer to four light emitting diodes 26 positioned closest to the head portion of each screw 24 among the plurality of light emitting diodes 26.

Bridge Central Portion 34a

As illustrated in FIG. 4A and FIG. 4B, each bridge 34 includes a bridge central portion 34a that is in close contact with (adhered to) the head portion of each screw 24. Each bridge central portion 34a is disposed in the central portion of the region F surrounded by four light emitting diodes 26 around the head portion of each screw 24. A maximum width Wa of each bridge central portion 34a has a value larger than the outer diameter D of the head portion of the screw 24, that is, for example, 6.5 mm. Most of each bridge central portion 34a is in close contact with the head portion of each screw 24, and the remaining portion of each bridge central portion 34a is raised and separated from the front face of the light source substrate 22.

Bridge Bottom Portion 34b

As illustrated in FIG. 4A and FIG. 4B, each bridge 34 includes bridge bottom portions 34b individually formed at both left and right sides (both sides in the width direction) of the bridge central portion 34a. That is, the bridge bottom portions 34b are individually formed at both sides of the bridge central portion 34a in the left-right direction that is at least one direction. Each bridge 34 is connected to the reflective sheet main body at the end portions of the two bridge bottom portions 34b. Each bridge bottom portion 34b is disposed in the middle of two light emitting diodes 26 around the head portion of each screw 24 among the plurality of light emitting diodes 26. The two light emitting diodes 26 around the head portion of each screw 24 are two light emitting diodes 26 (in the present embodiment, two light emitting diodes 26 adjacent to each other in the vertical direction) among the four light emitting diodes 26 positioned closest to the head portion of each screw 24. A portion of each bridge bottom portion 34b at a side close to the bridge central portion 34a is raised and separated from the front face of the light source substrate 22. A portion near the end of each bridge bottom portion 34b is not raised from the front face of the light source substrate 22, but may be raised from the front face of the light source substrate 22.

As illustrated in FIG. 4A, a width Wb of each bridge bottom portion 34b is smaller than a width Wa of the bridge central portion 34a. Additionally, the width Wb of each bridge bottom portion 34b is equal to or more than one third of the outer diameter D of the head portion of the screw 24, and equal to or less than two thirds of the outer diameter D of the head portion of the screw 24. The reason why the width Wb of each bridge bottom portion 34b is set to be equal to or more than one third of the outer diameter D of the head portion of the screw 24 is that when the width Wb is smaller than one third of the outer diameter D of the head portion of the screw 24, each bridge bottom portion 34b is easily broken. The reason why the width Wb of each bridge bottom portion 34b is set to be equal to or less than two thirds of the outer diameter D of the head portion of the screw 24 is that it is difficult to sufficiently secure distances between each bridge bottom portion 34b and the light emitting diodes 26 around the head portion of the screw 24.

As illustrated in FIG. 4A, a length M from the head portion of each screw 24 to the end portion of each bridge bottom portion 34b is larger than the outer diameter D of the head portion of the screw 24 and equal to or less than three times the outer diameter D of the head portion of the screw 24. The reason why the length M to the end portion of each bridge bottom portion 34b is set to be larger than the outer diameter D of the head portion of the screw 24 is that when the length M is equal to or smaller than the outer diameter D of the head portion of the screw 24, there is a concern that the rise of the reflective sheet 28 may progress to portions other than the bridge 34. The reason why the length M to the end portion of each bridge bottom portion 34b is set to be equal to or less than by three times the outer diameter D of the head portion of the screw 24 is that when the length M exceeds three times, the bridge central portion 34a is likely to be displaced with respect to the center of the head portion of the screw 24 when the reflective sheet 28 is attached to the front face of the light source substrate 22.

Actions and Effects of First Embodiment

Subsequently, actions and effects of the first embodiment of the disclosure will be described below.

In the first embodiment of the disclosure, as described above, the plurality of bridges 34 across the head portions of the screws 24 are formed (partitioned) by the slits 28s in each reflective sheet 28. Each bridge 34 is disposed so as to pass through the central portion of the region F surrounded by four light emitting diodes 26 around the head portion of each screw 24. Each bridge bottom portion 34b is disposed in the middle of two light emitting diodes 26 around the head portion of each screw 24 among the plurality of light emitting diodes 26. Thus, even when the rise of the reflective sheet 28 from the front face of the light source substrate 22 progresses to the end portion side of the bridge bottom portion 34b, the rise can be prevented from progressing to portions other than the bridge 34.

Thus, according to the first embodiment of the disclosure, the rise of the reflective sheet 28 can be prevented from progressing to the vicinity of the light emitting diodes 26 around the head portion of the screw 24. Thus, according to the first embodiment of the disclosure, it is possible to make the luminance unevenness of the display panel 12 inconspicuous and improve the display quality of the display device 10.

In particular, since the width Wb of each bridge bottom portion 34b is smaller than the width Wa of the bridge central portion 34a as described above, distances between the bridge bottom portion 34b and the light emitting diodes 26 around the head portion of the screw 24 can be sufficiently secured. Thus, according to the first embodiment of the disclosure, the rise of the reflective sheet 28 can be sufficiently prevented from progressing to the vicinity of the light emitting diodes 26 around the head portion of the screw 24.

Additionally, as described above, the width Wb of each bridge bottom portion 34b is equal to or larger than one third of the outer diameter D of the head portion of the screw 24 and equal to or smaller than two third of the outer diameter D of the head portion of the screw 24. Thus, according to the first embodiment of the disclosure, it is possible to sufficiently prevent the rise of the reflective sheet 28 from progressing to the vicinity of the light emitting diodes 26 around the head portion of the screw 24 while making it difficult to break each bridge bottom portion 34b.

In addition, in the first embodiment of the disclosure, as described above, each bridge 34 has an I-shape in a front view. Thus, according to the first embodiment of the disclosure, each bridge 34 has a simple shape, and the configuration of the display device 10 can be simplified.

Furthermore, in the first embodiment of the disclosure, as described above, the length M from the head portion of each screw 24 to the end portion of each bridge bottom portion 34b is larger than the outer diameter D of the head portion of the screw 24 and is equal to or smaller than three times the outer diameter D of the head portion of the screw 24. Thus, according to the first embodiment of the disclosure, it is possible to easily attach the reflective sheet 28 to the front face of the light source substrate 22 while suppressing a positional deviation of the bridge central portion 34a with respect to the center of the head portion of the screw 24.

Second Embodiment

Figure 5:
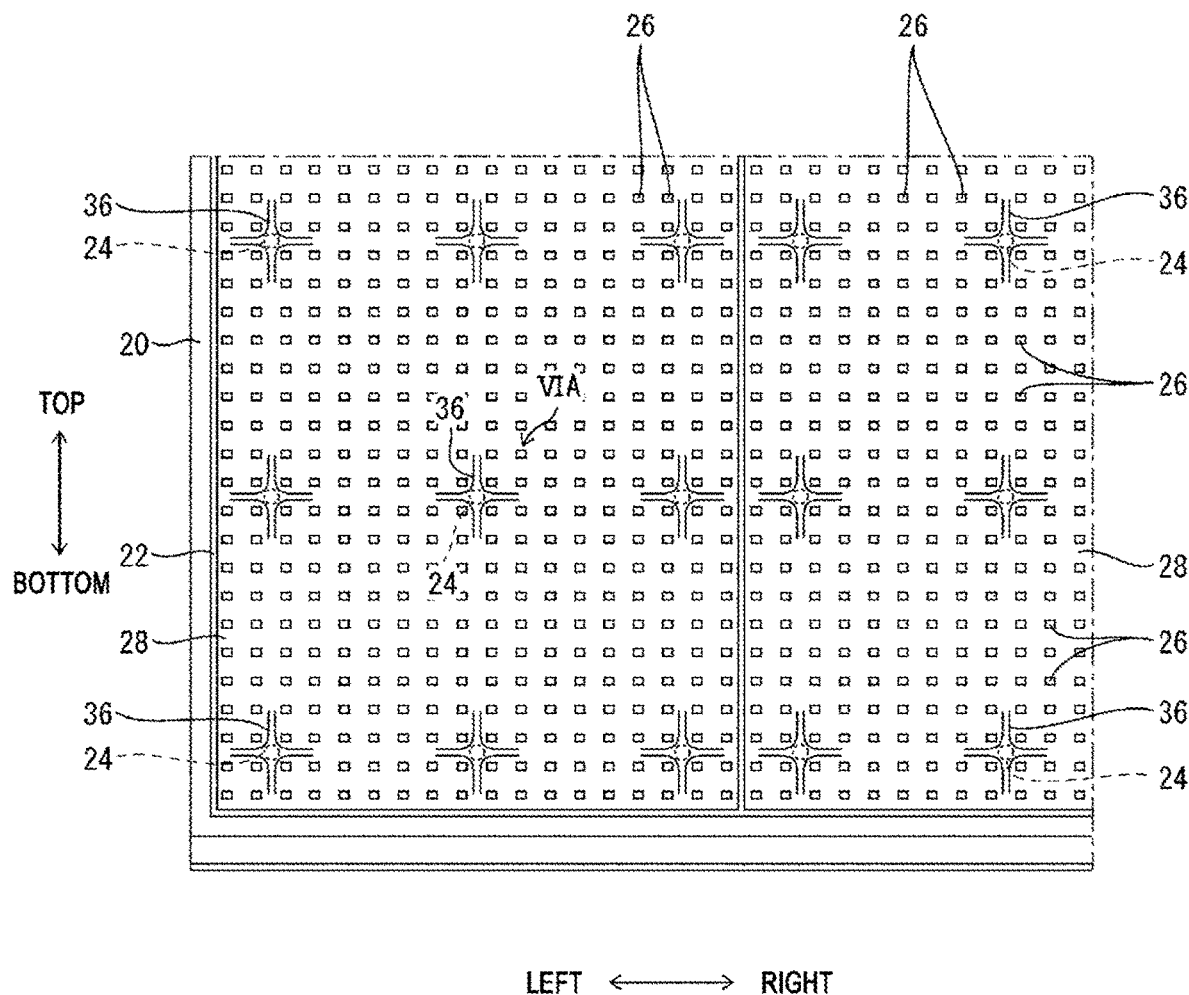
FIG. 5 is a schematic partial front view illustrating a state where a reflective sheet including bridges according to a second embodiment of the disclosure is attached to a light source substrate.
Figure 6A:
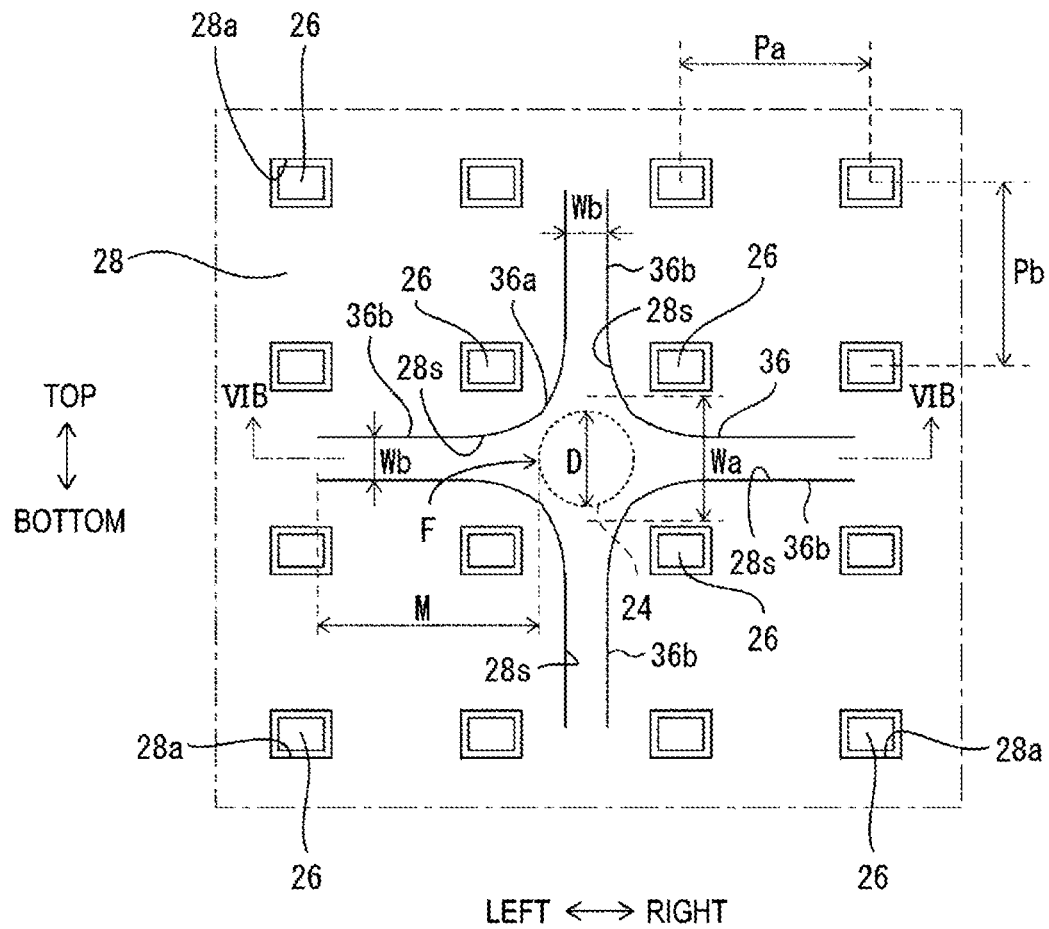
FIG. 6A is an enlarged view of VIA in FIG. 5.
Figure 6B:
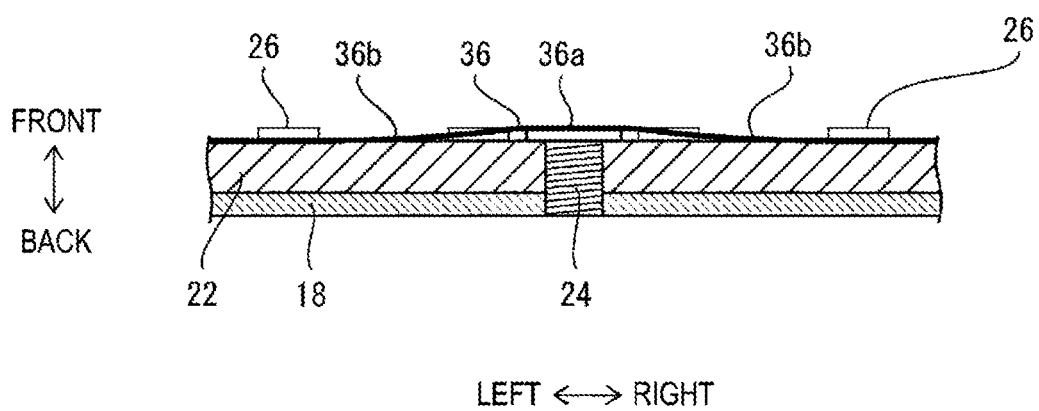
FIG. 6B is a schematic cross-sectional view taken along a line VIB-VIB in FIG. 6A.

A second embodiment of the disclosure will be described with reference to FIG. 5, FIG. 6A, and FIG. 6B. FIG. 5 is a schematic partial front view illustrating a state in which a reflective sheet including a bridge according to the second embodiment of the disclosure is attached to a light source substrate. FIG. 6A is an enlarged view of VIA in FIG. 5. FIG. 6B is a schematic cross-sectional view taken along a line VIB-VIB in FIG. 6A.

Bridge 36

As illustrated in FIG. 5 and FIG. 6A, in the second embodiment of the disclosure, instead of forming the bridges 34 (see FIG. 3 and FIG. 5), a plurality of bridges 36 provided across the head portions of the screws 24 are formed (partitioned) by the slits 28s in each reflective sheet 28. Each bridge 36 has a cross shape in a front view. Each bridge 36 is disposed so as to pass through a central portion of a region F surrounded by four light emitting diodes 26 around the head portion of each screw 24 among the plurality of light emitting diodes 26.

Bridge Central Portion 36a

As illustrated in FIG. 6A and FIG. 6B, each bridge 36 includes a bridge central portion 36a that is in close contact with (adhered to) the head portion of each screw 24. Each bridge central portion 36a is disposed at the central portion of the region F surrounded by four light emitting diodes 26 around the head portion of each screw 24. The maximum width Wa of each bridge central portion 36a has a value larger than the outer diameter D of the head portion of the screw 24, for example, 6.5 mm. Most of each bridge central portion 36a is in close contact with the head portion of each screw 24, and the remaining portion of each bridge central portion 36a is spaced and raised apart from the front face of the light source substrate 22.

Bridge Bottom Portion 36b

As illustrated in FIG. 6A and FIG. 6B, each bridge 36 includes bridge bottom portions 34b individually formed at both left and right sides (both sides in the width direction) and both upper and lower sides (both sides in the height direction) of the bridge central portion 36a. Each bridge 36 is connected to the reflective sheet main body at the end portions of the four bridge bottom portions 36b. Each bridge bottom portion 36b is disposed in the middle of two light emitting diodes 26 around the head portion of each screw 24 among the plurality of light emitting diodes 26. The bridge bottom portions 36b formed at both left and right sides (both sides in the width direction) of the bridge central portion 36a are individually disposed in the middle of two light emitting diodes 26 adjacent to each other in the vertical direction. The bridge bottom portions 36b formed at both upper and lower sides (both sides in the height direction) of the bridge central portion 36a are individually disposed in the middle of two light emitting diodes 26 adjacent to each other in the left-right direction. A portion of each bridge bottom portion 36b at a side close to the bridge central portion 36a is raised and separated from the front face of the light source substrate 22. A portion near the end of each bridge bottom portion 36b is not raised from the front face of the light source substrate 22, but may be raised from the front face of the light source substrate 22.

As illustrated in FIG. 6A, the width Wb of each bridge bottom portion 36b is smaller than the width Wa of the bridge central portion 36a. Additionally, the width Wb of each bridge bottom portion 36b is equal to or more than one third of the outer diameter D of the head portion of the screw 24, and equal to or less than two thirds of the outer diameter D of the head portion of the screw 24. The reason for this setting is the same as the reason for setting the width Wb of each bridge bottom portion 34b (see FIG. 4A). Further, the length M from the head portion of each screw 24 to the end portion of each bridge bottom portion 36b is larger than the outer diameter D of the head portion of the screw 24, and equal to or less than three times the outer diameter D of the head portion of the screw 24. The reason for this setting is the same as the reason for setting the length M from the head portion of each screw 24 to the end portion of each bridge bottom portion 34b.

Actions and Effects of Second Embodiment

Next, actions and effects of the second embodiment of the disclosure will be described below.

In the second embodiment of the disclosure, as described above, the plurality of bridges 36 provided across the head portions of the screws 24 are formed (partitioned) by the slits 28s in each reflective sheet 28. Each bridge 36 is disposed so as to pass through the central portion of the region F surrounded by four light emitting diodes 26 around the head portion of each screw 24. Each bridge bottom portion 36b is disposed in the middle of two light emitting diodes 26 around the head portion of each screw 24 among the plurality of light emitting diodes 26. Thus, even when the rise of the reflective sheet 28 from the front face of the light source substrate 22 progresses to the end portion side of the bridge bottom portion 36b, it is possible to prevent the rise from progressing to portions other than the bridge 36.

Thus, according to the second embodiment of the disclosure, same as the first embodiment of the disclosure, the rise of the reflective sheet 28 can be prevented from progressing to the vicinity of the light emitting diodes 26 around the head portion of the screw 24. Thus, according to the second embodiment of the disclosure, it is possible to make the luminance unevenness of the display panel 12 inconspicuous and improve the display quality of the display device 10.

In particular, since the width Wb of each bridge bottom portion 36b is smaller than the width Wa of the bridge central portion 36a as described above, distances between each bridge bottom portion 36b and the light emitting diodes 26 around the head portion of the screw 24 can be sufficiently secured. Thus, according to the second embodiment of the disclosure, the rise of the reflective sheet 28 can be sufficiently prevented from progressing to the vicinity of the light emitting diodes 26 around the head portion of the screw 24.

Additionally, as described above, the width Wb of each bridge bottom portion 36b is equal to or larger than one third of the outer diameter D of the head portion of the screw 24, and equal to or smaller than two thirds of the outer diameter D of the head portion of the screw 24. Thus, according to the second embodiment of the disclosure, it is possible to sufficiently prevent the rise of the reflective sheet 28 from progressing to the vicinity of the light emitting diodes 26 around the head portion of the screw 24 while making it difficult to break each bridge bottom portion 36b.

Further, in the second embodiment of the disclosure, as described above, each bridge 36 has a cross shape in a front view. Additionally, the length M from the head portion of each screw 24 to the end portion of each bridge bottom portion 36b is larger than the outer diameter D of the head portion of the screw 24, and equal to or smaller than three times the outer diameter D of the head portion of the screw 24. Thus, according to the second embodiment of the disclosure, it is possible to easily attach the reflective sheet 28 to the front face of the light source substrate 22 while suppressing a positional deviation of the bridge central portion 36a with respect to the center of the head portion of the screw 24.

Third Embodiment

Figure 7:
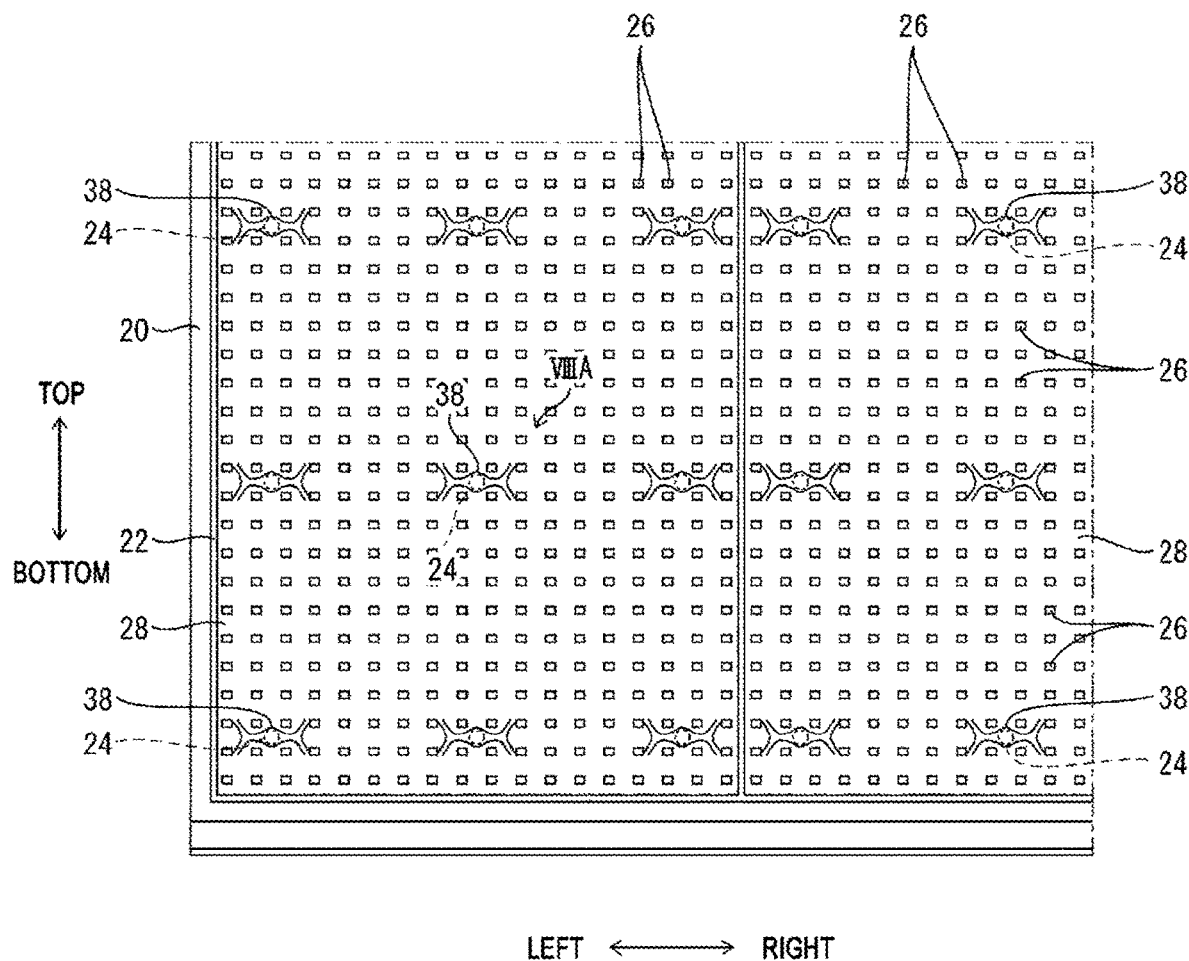
FIG. 7 is a schematic partial front view illustrating a state where a reflective sheet including bridges according to a third embodiment of the disclosure is attached to a light source substrate.
Figure 8A:
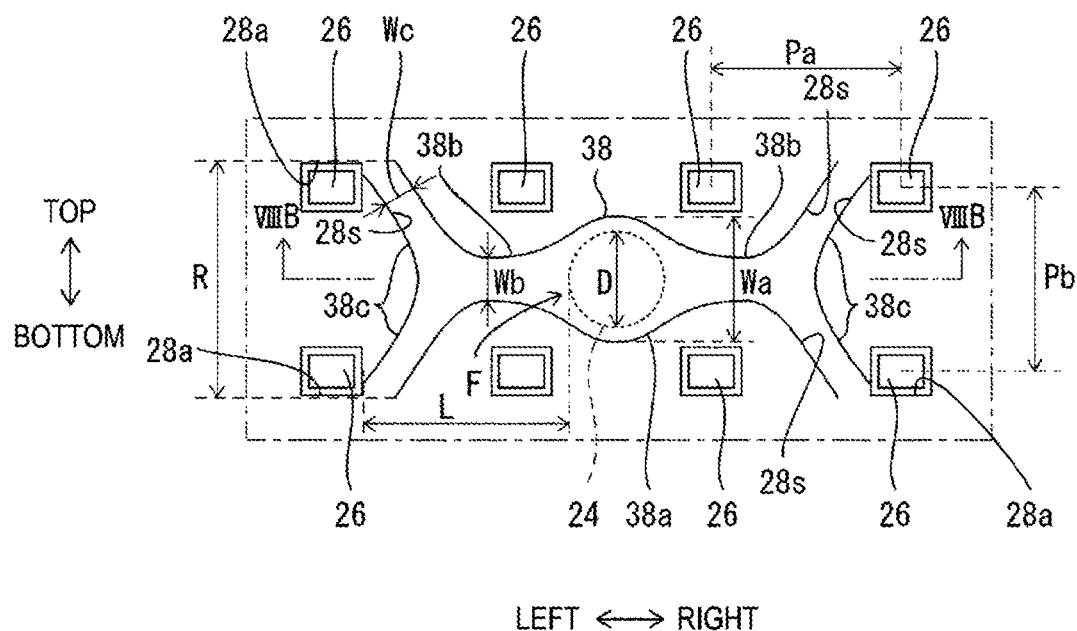
FIG. 8A is an enlarged view of VIIIA in FIG. 7.
Figure 8B:
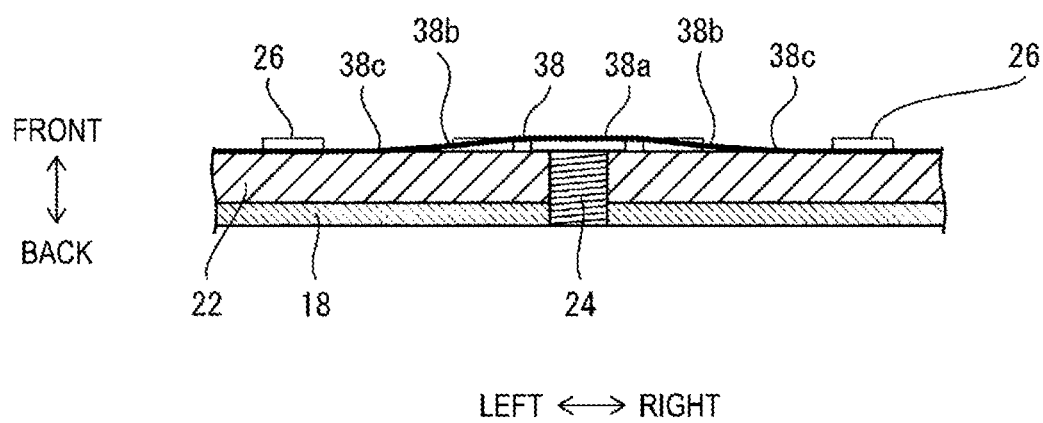
FIG. 8B is a schematic cross-sectional view taken along a line VIIIB-VIIIB in FIG. 8A.

A third embodiment according to the disclosure will be described with reference to FIG. 7, FIG. 8A, and FIG. 8B. FIG. 7 is a schematic partial front view illustrating a state in which a reflective sheet including bridges according to the third embodiment of the disclosure is attached to a light source substrate. FIG. 8A is an enlarged view of VIIIA in FIG. 7. FIG. 8B is a schematic cross-sectional view taken along a line VIIIB-VIIIB illustrated in FIG. 8A.

Bridge 38

As illustrated in FIG. 7 and FIG. 8A, in the third embodiment of the disclosure, instead of forming the bridges 34 (see FIG. 3 and FIG. 5), a plurality of bridges 38 provided across the head portions of the screws 24 are formed (partitioned) by the slits 28s in each reflective sheet 28. Each bridge 38 has an H-shape in a front view. Each bridge 38 is disposed so as to pass through a central portion of a region F surrounded by four light emitting diodes 26 around the head portion of each screw 24 among the plurality of light emitting diodes 26. The H-shape is not limited to a strict H-shape but includes a shape approximate to the H-shape.

Bridge Central Portion 38a

As illustrated in FIG. 8A and FIG. 8B, each bridge 38 includes a bridge central portion 38a that is in close contact with (adhered to) the head portion of each screw 24. Each bridge central portion 38a is disposed at a central portion of the region F surrounded by four light emitting diodes 26 around the head portion of each screw 24. The maximum width Wa of each bridge central portion 38a is a value larger than the outer diameter D of the head portion of the screw 24, for example, 6.5 mm. Most of each bridge central portion 38a is in close contact with the head portion of each screw 24, and the remaining portion of each bridge central portion 38a is raised and separated from the front face of the light source substrate 22.

Bridge Bottom Portion 38b

As illustrated in FIG. 8A and FIG. 8B, each bridge 38 includes bridge bottom portions 38b individually formed at both left and right sides (both sides in the width direction) of the bridge central portion 38a. Each bridge bottom portion 38b is disposed in the middle of two light emitting diodes 26 (two light emitting diodes 26 adjacent to each other in the vertical direction) around the head portion of each screw 24 among the plurality of light emitting diodes 26. A portion of each bridge bottom portion 38b at a side close to the bridge central portion 38a is raised and separated from the front face of the light source substrate 22. A portion of each bridge bottom portion 38b at the side far from the bridge central portion 38a may be raised and separated from the front face of the light source substrate 22. A portion near the end of each bridge bottom portion 38b is not raised from the front face of the light source substrate 22, but may be raised from the front face of the light source substrate 22.

The width Wb of each bridge bottom portion 38b is smaller than the width Wa of the bridge central portion 38a. Further, the width Wb of each bridge bottom portion 38b is equal to or more than one third of the outer diameter D of the head portion of the screw 24, and equal to or less than two thirds of the outer diameter D of the head portion of the screw 24. The reason for this setting is the same as the reason for setting the width Wb of each bridge bottom portion 34b (see FIG. 3 and FIG. 4A).

Bridge Branch Portion 38c

As illustrated in FIG. 8A and FIG. 8B, each bridge 38 includes two bridge branch portions 38c formed at the end portion of each bridge bottom portion 38b so as to be branched into two sections. Each bridge 38 is connected to the reflective sheet main body at each end portion of the four bridge branch portions 38c (end portion at the side opposite to the bridge bottom portion 38b). Each bridge branch portion 38c is in close contact with the front face of the light source substrate 22. A portion of each bridge branch portion 38c at a side closer to the bridge bottom portion 38b may be raised and separated from the front face of the light source substrate 22.

A width Wc of each bridge branch portion 38c is substantially equal to the width of each bridge bottom portion 38b, and is smaller than the width Wa of the bridge central portion 38a. Additionally, the width Wc of each bridge branch portion 38c is equal to or more than one third of the outer diameter D of the head portion of the screw 24, and equal to or less than two thirds of the outer diameter D of the head portion of the screw 24. A space R between the end portions of the two bridge branch portions 38c branched from one bridge bottom portion 38b is about twice the outer diameter D of the head portion of the screw 24, for example, 15 mm.

A length L from the head portion of each screw 24 to the end portion of each bridge branch portion 38c is larger than the outer diameter D of the head portion of the screw 24, and equal to or less than three times the outer diameter D of the head portion of the screw 24. The reason why the length L to the end portion of each bridge branch portion 38c is set to be larger than the outer diameter D of the head portion of the screw 24 is that when the length L is equal to or smaller than the outer diameter D of the head portion of the screw 24, there is a concern that the rise of the reflective sheet 28 may progress to portions other than the bridge 38. The reason why the length L to the end portion of each bridge branch portion 38c is set to be equal to or less than three times the outer diameter D of the head portion of the screw 24 is that if the length L exceeds three times the outer diameter D, the bridge central portion 38a is likely to be displaced with respect to the center of the head portion of the screw 24 when the reflective sheet 28 is attached to the front face of the light source substrate 22.

Actions and Effects of Third Embodiment

Next, actions and effects of the third embodiment of the disclosure will be described below.

In the third embodiment of the disclosure, as described above, the plurality of bridges 38 across the head portions of the screws 24 are formed by the slits 28s in each reflective sheet 28. Each bridge 38 is disposed so as to pass through the central portion of the region F surrounded by four light emitting diodes 26 around the head portion of each screw 24. Each bridge bottom portion 38b is disposed in the middle of two light emitting diodes 26 around the head portion of each screw 24 among the plurality of light emitting diodes 26. Two bridge branch portions 38c are formed at an end portion of each bridge bottom portion 38b so as to be branched into two sections. Thus, the end portion side of each bridge bottom portion 38b can be sufficiently brought into close contact with (adhered to) the front face of the light source substrate 22, and the rise of the reflective sheet 28 from the front face of the light source substrate 22 is less likely to progress to the end portion side of the bridge bottom portion 38b. Even when the rise of the reflective sheet 28 progresses to the end portion side of the bridge bottom portion 38b, the rise can be prevented from progressing to portions other than the bridge 38.

Thus, according to the third embodiment of the disclosure, same as the first embodiment of the disclosure, the rise of the reflective sheet 28 can be prevented from progressing to the vicinity of the light emitting diodes 26 around the head portion of the screw 24. Consequently, according to the third embodiment of the disclosure, it is possible to make the luminance unevenness of the display panel 12 inconspicuous and improve the display quality of the display device 10.

In particular, since the width Wb of each bridge bottom portion 38b is smaller than the width Wa of the bridge central portion 38a as described above, distances between each bridge bottom portion 38b and the light emitting diodes 26 around the head portion of the screw 24 can be sufficiently secured. As a result, according to the third embodiment of the disclosure, it is possible to sufficiently prevent the rise of the reflective sheet 28 from progressing to the vicinity of the light emitting diodes 26 around the head portion of the screw 24.

Additionally, as described above, the width Wb of each bridge bottom portion 38b and the width Wc of each bridge branch portion 38c are equal to or more than one third of the outer diameter D of the head portion of the screw 24, and equal to or less than two thirds of the outer diameter D of the head portion of the screw 24. Thus, according to the third embodiment of the disclosure, it is possible to sufficiently prevent the rise of the reflective sheet 28 from progressing to the vicinity of the light emitting diodes 26 around the head portion of the screw 24 while making the bridge 38 difficult to break.

Further, in the third embodiment of the disclosure, as described above, each bridge 38 has an H-shape in a front view. Additionally, the length L from the head portion of each screw 24 to the end portion of each bridge branch portion 38c is larger than the outer diameter D of the head portion of the screw 24, and equal to or less than three times the outer diameter D of the head portion of the screw 24. Consequently, according to the third embodiment of the disclosure, it is possible to easily attach the reflective sheet 28 to the front face of the light source substrate 22 while suppressing a positional deviation of the bridge central portion 38a with respect to the center of the head portion of the screw 24.

Supplement

A display device according to a first aspect of the disclosure includes a chassis provided at a back face side of a display panel configured to display an image, a light source substrate attached to a front face of the chassis by using a fixing member, the light source substrate including, at a front face of the light source substrate, a plurality of light sources configured to emit light toward the display panel, and a reflective sheet attached to the front face of the light source substrate in a manner of covering a head portion of the fixing member, the reflective sheet including a plurality of openings configured to expose the plurality of light sources, the reflective sheet being configured to reflect the light emitted from the plurality of light sources toward a side of the display panel. A bridge across the head portion of the fixing member is formed (partitioned) in the reflective sheet by a slit, and the bridge passes through a central portion of a region surrounded by four light sources around the head portion of the fixing member among the plurality of light sources.

According to the configuration, as described above, the bridge across the head portion of the fixing member is formed by the slit in the reflective sheet. The bridge is disposed so as to pass through the central portion of the region surrounded by the four light sources around the head portion of the fixing member. Thus, the rise of the reflective sheet from the front face of the light source substrate can be prevented from progressing to portions other than the bridge. As a result, it is possible to suppress the progress of the rise of the reflective sheet to the vicinity of the light sources around the head portion of the fixing member. Consequently, it is possible to make the luminance unevenness of the display panel inconspicuous and improve the display quality of the display device.

In a display device according to a second aspect of the disclosure, in the first aspect, the bridge may include a bridge central portion disposed in a central portion of a region surrounded by four light sources around the head portion of the fixing member among the plurality of light sources, the bridge central portion being in contact with the head portion of the fixing member, and at least two bridge bottom portions individually formed at both sides of the bridge central portion in at least one direction, the at least two bridge bottom portions being individually disposed in a middle of two light sources around the head portion of the fixing member among the plurality of light sources.

According to the configuration, even when the rise of the reflective sheet generated when the reflective sheet is attached to the front face of the light source substrate progresses to a side of an end portion of the bridge bottom portion, the rise can be prevented from progressing to portions other than the bridge.

In a display device according to a third aspect of the disclosure, in the second aspect, the bridge may further include two bridge branch portions branched into two sections at an end portion of each bridge bottom portion.

According to the configuration, the side of the end portion of each bridge bottom portion can be sufficiently brought into close contact with (adhered to) the front face of the light source substrate, and the rise of the reflective sheet is difficult to progress to the side of the end portion of the bridge bottom portion.

In a display device according to a fourth aspect of the disclosure, in any one of the first to third aspects, the bridge may include two bridge bottom portions, and the bridge may have an I-shape in a front view.

According to the configuration, the bridge has a simple shape, and the configuration of the display device can be simplified.

In a display device according to a fifth aspect of the disclosure, in any one of the first to third aspects, the bridge may include four bridge bottom portions including two bridge bottom portions individually formed at both sides of the bridge central portion in a first direction and two bridge bottom portions individually formed at both sides of the bridge central portion in a second direction substantially orthogonal to the first direction, and the bridge may have a cross shape in a front view.

According to the configuration, it is possible to easily attach the reflective sheet to the front face of the light source substrate while suppressing a positional deviation of the bridge central portion with respect to a center of the head portion of the fixing member.

In a display device according to a sixth aspect of the disclosure, in any one of the first to third aspects, the bridge may include two bridge bottom portions, and the bridge may have an H-shape in a front view.

According to the configuration, it is possible to easily attach the reflective sheet to the front face of the light source substrate while suppressing a positional deviation of the bridge central portion with respect to a center of the head portion of the fixing member.

In a display device according to a seventh aspect of the disclosure, in any one of the second to sixth aspects, a width of each bridge bottom portion may be smaller than a maximum width of the bridge central portion.

According to the configuration, distances between the bridge bottom portion and the light sources around the head portion of the fixing member can be sufficiently secured. As a result, the progress of the rise of the reflective sheet to the vicinity of the light sources around the head portion of the fixing member can be sufficiently suppressed.

In a display device according to an eighth aspect of the disclosure, in any one of the second to seventh aspects, a width of the bridge bottom portion may be equal to or more than one third of a maximum width of the head portion of the fixing member, and equal to or less than two thirds of the maximum width of the head portion of the fixing member.

According to the configuration, it is possible to sufficiently prevent the rise of the reflective sheet from progressing to the vicinity of the light sources around the head portion of the fixing member while making the bridge bottom portion difficult to break.

In a display device according to a ninth aspect of the disclosure, in any one of the second to eighth aspects, a length from the head portion of the fixing member to an end portion of each bridge bottom portion may be larger than a maximum width of the head portion of the fixing member, and equal to or smaller than three times the maximum width of the head portion of the fixing member.

According to the configuration, it is possible to easily attach the reflective sheet to the front face of the light source substrate while suppressing a positional deviation of the bridge central portion with respect to a center of the head portion of the fixing member.

In a display device according to a tenth aspect of the disclosure, in the third aspect or the sixth aspect, a length from the head portion of the fixing member to an end portion of each of the two bridge branch portions may be larger than a maximum width of the head portion of the fixing member and equal to or smaller than three times the maximum width of the head portion of the fixing member.

According to the configuration, it is possible to easily attach the reflective sheet to the front face of the light source substrate while suppressing a positional deviation of the bridge central portion with respect to a center of the head portion of the fixing member.

APPENDIX

The disclosure is not limited to the embodiments described above, and various modifications may be made within the scope of the claims. Embodiments obtained by appropriately combining technical approaches disclosed in the different embodiments also fall within the technical scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:
a chassis provided at a back face side of a display panel configured to display an image;
a light source substrate attached to a front face of the chassis by using a fixing member, the light source substrate including, at a front face of the light source substrate, a plurality of light sources configured to emit light toward the display panel; and
a reflective sheet attached to the front face of the light source substrate in a manner of covering a head portion of the fixing member, the reflective sheet including a plurality of openings configured to expose the plurality of light sources, the reflective sheet being configured to reflect light emitted from the plurality of light sources toward a side of the display panel,
wherein a bridge across the head portion of the fixing member is formed in the reflective sheet by a slit, and the bridge passes through a central portion of a region surrounded by four light sources around the head portion of the fixing member among the plurality of light sources.

2. The display device according to claim 1,
wherein the bridge includes
a bridge central portion disposed in a central portion of a region surrounded by four light sources around the head portion of the fixing member among the plurality of light sources, the bridge central portion being in contact with the head portion of the fixing member, and
at least two bridge bottom portions individually formed at both sides of the bridge central portion in at least one direction, the at least two bridge bottom portions being individually disposed in a middle of two light sources around the head portion of the fixing member among the plurality of light sources.

3. The display device according to claim 2,
wherein the bridge further includes two bridge branch portions branched into two sections at an end portion of each bridge bottom portion.

4. The display device according to claim 3,
wherein the bridge includes two bridge bottom portions, and
the bridge has an H-shape in a front view.

5. The display device according to claim 3,
wherein a length from the head portion of the fixing member to an end portion of each of the two bridge branch portions is larger than a maximum width of the head portion of the fixing member and equal to or smaller than three times the maximum width of the head portion of the fixing member.

6. The display device according to claim 2,
wherein the bridge includes two bridge bottom portions, and
the bridge has an I-shape in a front view.

7. The display device according to claim 2,
wherein the bridge includes four bridge bottom portions including two bridge bottom portions individually formed at both sides of the bridge central portion in a first direction and two bridge bottom portions individually formed at both sides of the bridge central portion in a second direction substantially orthogonal to the first direction, and
the bridge has a cross shape in a front view.

8. The display device according to claim 2,
wherein a width of each bridge bottom portion is smaller than a maximum width of the bridge central portion.

9. The display device according to claim 2,
wherein a width of the bridge bottom portion is equal to or more than one third of a maximum width of the head portion of the fixing member, and equal to or less than two thirds of the maximum width of the head portion of the fixing member.

10. The display device according to claim 2, wherein a length from the head portion of the fixing member to an end portion of each bridge bottom portion is larger than a maximum width of the head portion of the fixing member, and equal to or smaller than three times the maximum width of the head portion of the fixing member.

* * * * *